United States Patent [19]
Doura et al.

[11] Patent Number: 6,043,627
[45] Date of Patent: Mar. 28, 2000

[54] BATTERY CHARGER WITH REDUNDANT PROTECTION CIRCUITS

[75] Inventors: Minoru Doura, San Jose, Calif.; Yasuhito Eguchi; Hideki Nakajo, both of Tokyo, Japan

[73] Assignees: Sony Corporation, Tokyo, Japan; Sony Electronics Inc., Park Ridge, N.J.

[21] Appl. No.: 09/099,055

[22] Filed: Jun. 17, 1998

Related U.S. Application Data

[63] Continuation of application No. 08/832,636, Apr. 4, 1997, abandoned.

[51] Int. Cl.[7] ........................................................ H02J 7/00
[52] U.S. Cl. ............................................ 320/116; 320/134
[58] Field of Search ..................................... 320/116, 134, 320/137, 136

[56] References Cited

U.S. PATENT DOCUMENTS 5,608,304   3/1997   Okumura ................................ 320/134

*Primary Examiner*—Peter S. Wong
*Assistant Examiner*—Lawrence Luk
*Attorney, Agent, or Firm*—Gary B. Goates; Harold T. Fujii

[57] ABSTRACT

A battery charging system with redundant overcharge protection. The voltage across a plurality of series connected battery cells as well as the voltage across each individual cell is monitored both at a battery module and a host charging system. In the event an overcharging situation is detected, by the battery module, a first switch is open-circuited to prevent overcharging. In the event an overcharging situation is detected in the host system via a communication channel with the battery module or damage to the first switch is detected, a second switch is open-circuited in the host system to prevent overcharging, thus providing a redundant level of security against overcharging the battery cells.

8 Claims, 2 Drawing Sheets

BATTERY CHARGER WITH REDUNDANT PROTECTION CIRCUITS

This application a continuation, of application Ser. No. 08/832.636, filed Apr. 4, 1997, now abandoned which is hereby incorporated by reference.

BACKGROUND OF THE INVENTION

1. Field of the Invention

This invention relates generally to the field of battery chargers with overcharge protection circuits. More particularly, this invention relates to a charging system in which a battery module is charged through a host system and wherein redundant overcharging protection is provided in the host system as well as the battery module.

2. Background

Lithium ion batteries have become very popular in recent years due to their high energy density, high terminal voltage and lack of a memory effect which is common in other rechargeable batteries such as nickel cadmium. While lithium ion batteries have many advantages, they must be properly charged in order for the user to obtain full benefit of these batteries. For this reason, safeguards have been taken to assure that lithium ion batteries are carefully charged and include overcharge protection such as that described in U.S. Pat. No. 5,493,197 to Eguchi et al. and U.S. Pat. No. 5,530,336, also to Eguchi et al. Examples of overcharge protection circuits may be found in U.S. Pat. No. 5,304,915 to Sampei et al. and PCT application Serial Number PCT/JP 93/01536 to Masaru et al. Each of the above documents are hereby incorporated by reference. However, an additional problem exists when the battery module has been damaged, for example, by being dropped. The protective switch and associated circuits in the battery module could become inoperative and therefore, the battery module would lose overcharge protection.

The present invention addresses the problem by providing a strong measure of redundancy in a battery charging system.

SUMMARY OF THE INVENTION

It is an object of the present invention to provide an improved battery charging system which includes a host system supplying charging current to a battery module. Redundant measuring and switching provisions are provided in both the host system and battery module to assure that charging current is cut off to the battery cells if a potential overcharge scenario develops.

It is a feature that the present invention provides redundant overcharge protection using the intelligence already contained in a host system which may include a personal computer such as a notebook computer.

These and other objects, advantages and features of the invention will become apparent to those skilled in the art upon consideration of the following description of the invention.

The features of the invention believed to be novel are set forth with particularity in the appended claims. The invention itself however, both in its organization and method of operation, together with further objects and advantages thereof, may be best understood by reference to the following description, taken in conjunction with the accompanying drawing.

DETAILED DESCRIPTION OF THE INVENTION

Figure 1:
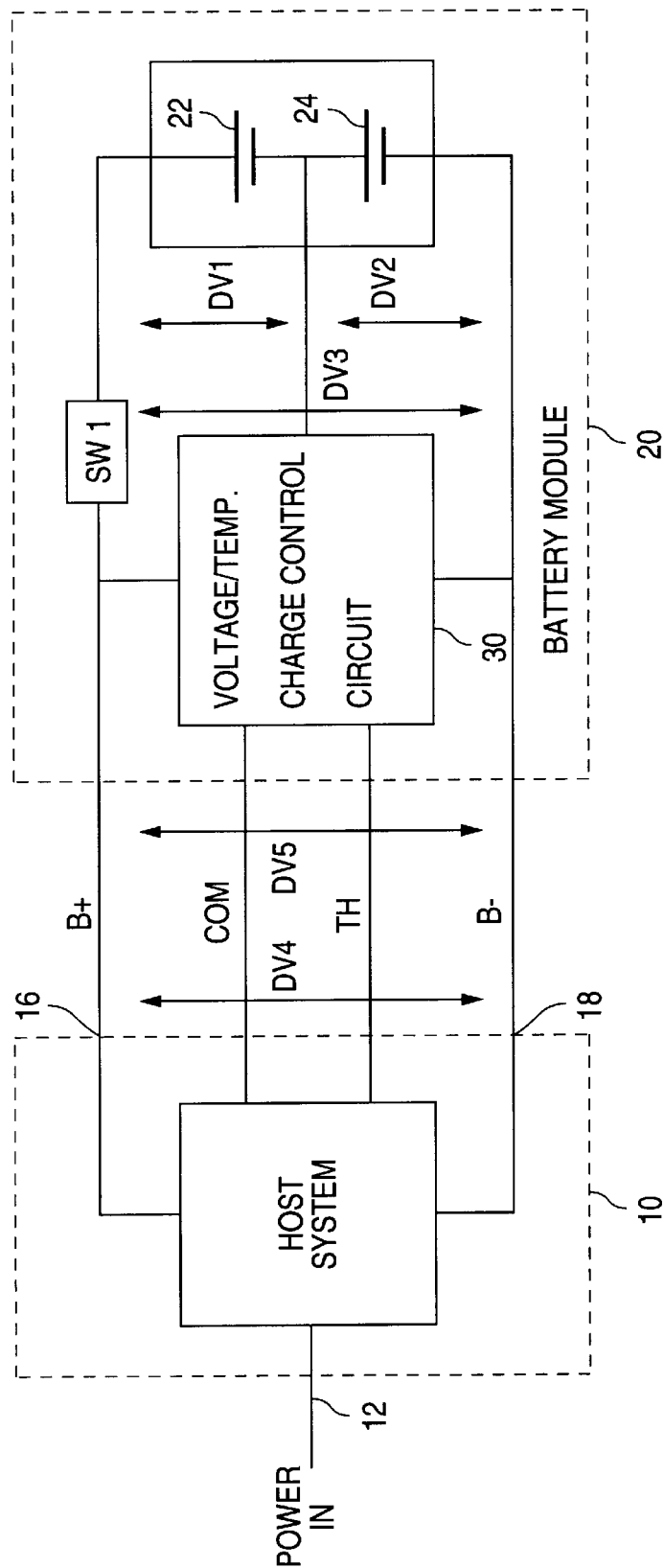
FIG. 1 is a block diagram of a charging system of the prior art.

While this invention is susceptible of embodiment in many different forms, there is shown in the drawings and will be herein described in detail, specific embodiments with the understanding that the present disclosure is to be considered as an example of the principles of the invention and not intended to limit the invention to the specific embodiment shown and described. In the description below, like reference numerals are used to describe the same, similar or corresponding parts under several drawings.

Referring now to FIG. 1, a host system 10 is connected with a source of power 12, such as connection to household power. Host system 10, in the preferred embodiment, is a notebook computer system or the like which has an internal microprocessor, memory and other intelligence capable of operating under control of a control program. Host system 10, in addition to operating as a notebook computer, includes battery charging circuitry which produces battery voltages, B+ and B− at terminals 16 and 18 thereof. These terminals 16 and 18 are coupled to a battery module 20 and supply power to the host system when power is not supplied via power connection 12. When the power connection 12 is connected to household power, the battery module is charged by the charging circuitry of host system 10.

In this example, battery module 20 includes a pair of lithium ion cells designated 22 and 24. These lithium ion cells 22 and 24 are connected in series to produce an appropriate level of voltage in order to power the host system 10. Of course, more than two cells could also be used if a higher operating voltage is required. Cells 22 and 24 are connected to the B+ and B− battery terminals of the host through a switch designated SW1. Switch SW1 resides within battery module 20 and is controlled by a control circuit 30 which monitors the temperature of the battery module, as well as the voltage of cells 22 and 24, along with the sum of the voltages across the series combination of cells 22 and 24. These voltages are designated DV1, DV2 and DV3 respectively in FIG. 1. The control circuit also serves to balance DV1 and DV2 as disclosed in U.S. Pat. No. 5,493,197, which is hereby incorporated by reference.

In operation, switch SW1 is open circuited in the event any of the voltages DV1, DV2 or DV3 departs from a predetermined range of voltages or compare unfavorably with one another. Moreover, switch SW1 is also opened, in the event that the temperature of the battery module is too high or too low to safely charge battery cells 22 and 24. Under most circumstances, the circuitry shown in FIG. 1 provides a high degree of protection against overcharging since not only is the total voltage DV3 across the series connected cells 22 and 24 monitored by control circuit 30, but each individual cell voltage DV1 and DV2 is also monitored to prevent overcharging of an individual cell in a series connection. However, in the event that overcharging takes place in a battery module due to a failure in switch SW1, failure in the control circuit 30, or damage to the battery module switch, there is still a chance that overcharging can occur. The present invention addresses this problem in the embodiment shown in FIG. 2.

Figure 2:
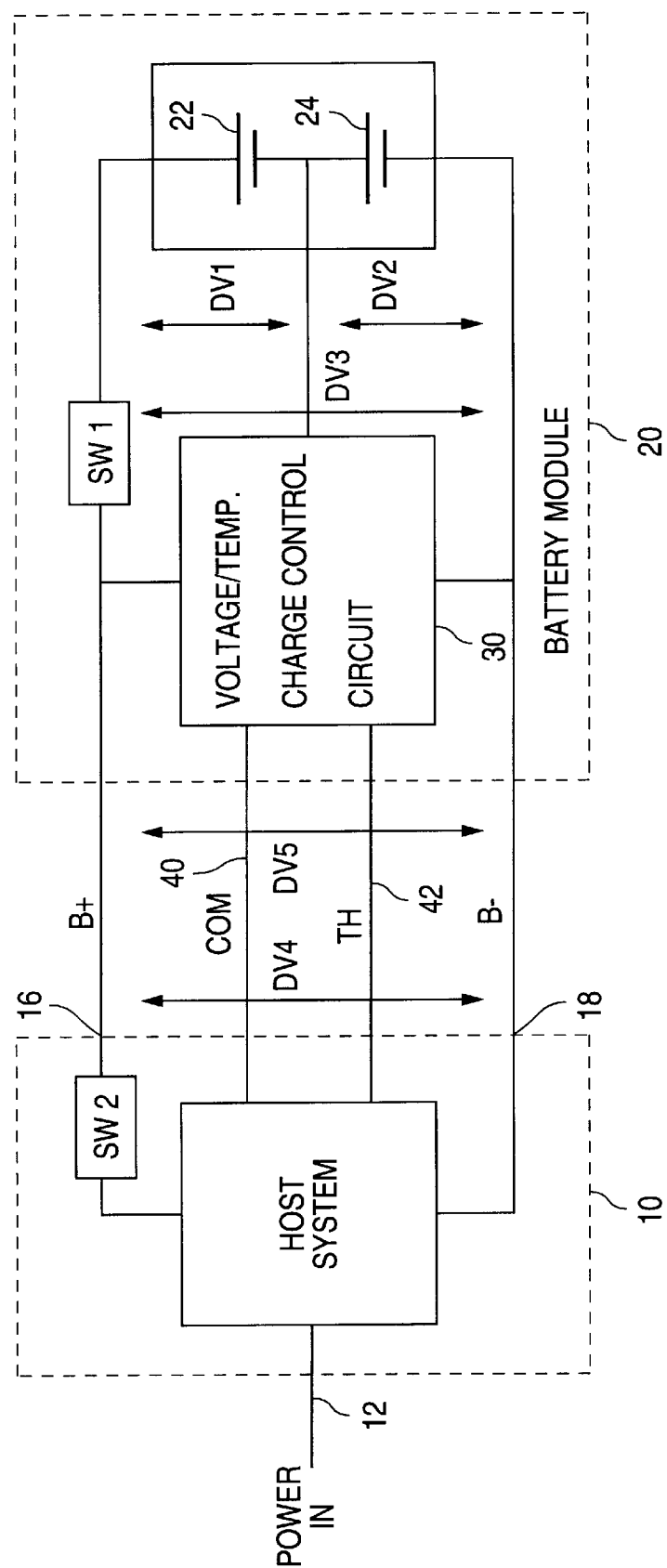
FIG. 2 is a block diagram of the charging system of the present invention.

Referring now to FIG. 2, a charging system according to the present invention is configured in a manner similar to that of FIG. 1 in that host system 10 provides charging current via terminal 16 and 18 to the battery module 20.

However, host system 10 includes a series switch designated SW2 through which charging current must past. In addition, one or more data connections, such as connection 40, provide communication between the host system 10 and the battery module 20 so that the host system 10 can receive information regarding the charging voltages supplied to cells 22 and 24 as well as the total voltage across the series connection of cells 22 and 24. Communication connection 40 provides the voltage DV5 as measured at the battery module 20 terminals by the battery module 20 to the host system 10. In addition, connection 42 is provided which supplies host system 10 with information regarding the temperature of the battery module 20. Signal TH which is present at connection 42 may in fact be the analog voltage across a thermistor which can be interpreted by the host system 10 as a measure of the temperature of battery module 20. In addition, voltages DV1, DV2, DV3, and DV5 can be detected and compared by software means. Those skilled in the art will recognize other ways to monitor the battery module temperature at the battery module such as temperature sensing means, disclosed in U.S. Pat. No. 5,459, 391, which is hereby incorporated by reference.

At the host system 10, the voltage across terminals 16 and 18 is measured as DV4 and may be compared with the voltage measured by the battery module as DV5 to determine that these voltages are within a predetermined tolerance of one another. Moreover, the data transmitted over connection 40 which indicates the voltages DV1, DV2 and DV3 are analyzed at the host system 10 to assure that none of these voltages are outside of a predetermined specification.

In the event the host system 10 detects that an abnormality has taken place within the battery module 20, the host system 10 can interrupt in the flow of charging current to the battery module 20 by open circuiting switch SW2, thus providing a redundant mechanism to switch SW1 and the control circuit 30 to ensure that cells 22 and 24 are not overcharged.

Several scenarios are possible wherein host system 10 would open circuit switch SW2. Some possible scenarios are tabulated in Table 1 below. Hardware is designated HWR and software is designated SWR.

TABLE 1

| CONDITION | ACTION |
| --- | --- |
| (DV1 + DV2) ≈ DV3 | SW1 OPEN |
| (DV1 + DV2) ≈ DV3 | SW2 OPEN |
| DV5 (HWR) ≈ DV5 (SWR) | SW1 OPEN |
| DV5 (HWR) ≈ DV5 (SWR) | SW2 OPEN |
| (DV1 + DV2) ≈ DV4 | SW1 OPEN |
| (DV1 + DV2) ≈ DV4 | SW2 OPEN |
| DV4 ≈ DV5 (HWR or SWR) | SW1 OPEN |
| DV4 ≈ DV5 (HWR or SWR) | SW2 OPEN |
| SW1 MALFUNCTIONS | SW2 OPEN |
| TEMPERATURE OUT OF RANGE | SW1 OPEN |
| TEMPERATURE OUT OF RANGE | SW2 OPEN |

Thus, in the present invention, a redundant charging system is provided in which the charging of a battery module is monitored, not only within the battery module 20 in order to provide overcharge protection, but also within a host system 10 to provide overcharging protection. In such a system, overcharging due to an overvoltage condition or out of temperature range condition will result in open circuiting of switch SW1 or switch SW2 or both.

Thus, it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as follows within the scope of the appended claims.

What is claimed is:

1. A battery module comprising:

first switching means, inside said battery module, for selectively interrupting charging current to a series of battery cells;

monitoring means, inside said battery module, for monitoring a voltage across each of the individual battery cells in the series of battery cells and across the series of battery cells;

software means for controlling said first switching means;

hardware means for controlling said switching means;

a communication channel for coupling information from said battery module to a host system, the information including a voltage across each of the battery cells in the series of battery cells and across the complete series of battery cells and a battery temperature.

2. A host system comprising:

a switch, for selectively interrupting a charging current;

a data connection for coupling information from a battery module, including a plurality of battery cells, to said host system, said information including a voltage across each of the plurality of battery cells, across a series connection of said plurality of battery cells, and a battery module temperature; and switching means for open-circuiting a connection between said host system and the battery module if said host system detects an overcharging condition, detects that the battery module is inoperative or detects that the battery module temperature exceeds a specified limit.

3. A battery charging system, comprising in combination:

a battery module including a plurality of series-connected battery cells;

monitoring means, situated inside said battery module, for monitoring a voltage across each of said plurality of battery cells to detect an overcharging condition;

a first switch, situated inside said battery module, for selectively interrupting charging currents to said plurality of battery cells;

first switching means, situated inside said battery module, for open-circuiting said first switch in the event said monitoring means detects the overcharging condition;

a host system including means for providing charging current to said battery module;

a communication channel for coupling information form said battery module to said host system, said information including the voltage across each of said plurality of battery cells;

a connection for coupling temperature information from said battery module to said host system; and second switching means, situated inside said host system, for open-circuiting said second switch in the event that said host system detects an overcharging condition of any of said plurality of battery cells.

4. The battery charging system according to claim 3 further comprising:

comparison means for said battery module to compare a sum of the voltages across each of said plurality of battery cells and a total voltage, wherein said first switching means open-circuits said first switch situated inside said battery module in the event that the sum of the voltages across each of said plurality of battery cells does equal said sum of the individual cell voltages.

5. The battery charging system according to claim 3 further comprising:

detection means for detecting a battery module terminal voltage and a host system terminal voltage;

determining means for determining if said host system terminal voltage is equal to said battery module terminal voltage, wherein said first switching means open-circuits said first switch situated inside said battery module in the event that said host system terminal voltage is not equal to said battery module terminal voltage.

6. The battery charging system according to claim 3 wherein said detection means further comprises:

battery module hardware for detecting said terminal voltage of said battery module; and battery module software for detecting said terminal voltage of said battery module, wherein said host system compares a voltage detected with said battery module hardware with a voltage detected by said battery module software, and wherein said battery charging system open-circuits said first switch situated inside said battery module in the event that said hardware detected voltage does not equal said software detected voltage.

7. The battery charging system according to claim 3, wherein said battery module software detects each of said plurality of individual cell voltage and transmits said voltages through a communication terminal of said battery pack and a communication terminal of said host system, further wherein said host system detects a terminal voltage of said host system and said host system terminal voltage is compared with a sum of said individual cell voltages, and further wherein said first switching means open-circuits said first switch, situated inside said battery module, or said second switch, situated inside said host system, in the event said host system terminal voltage does not equal the sum of said individual cell voltages.

8. A battery system comprising:

a battery module;

a second module;

a first switching module, inside said battery module, configured to selectively interrupt charging current to a series of battery cells;

a monitor circuit, inside said battery module, configured to monitor a set of voltages across each of the individual battery cells in the series of battery cells and a voltage across the series of battery cells;

software configured to control said first switching module;

hardware configured to contorl said first switching module;

a communication channel for coupling information from said battery module to said second module, the information including a set of voltages across each of the individual battery cells in the series of battery cells, a voltage across the series of battery cells and a battery temperature; and a second switching module for open-circuiting a second switch located inside said second module by communicating to said second module through said communication port that an overcharged condition of said battery cells has been detected.

* * * * *